Patented Jan. 8, 1935

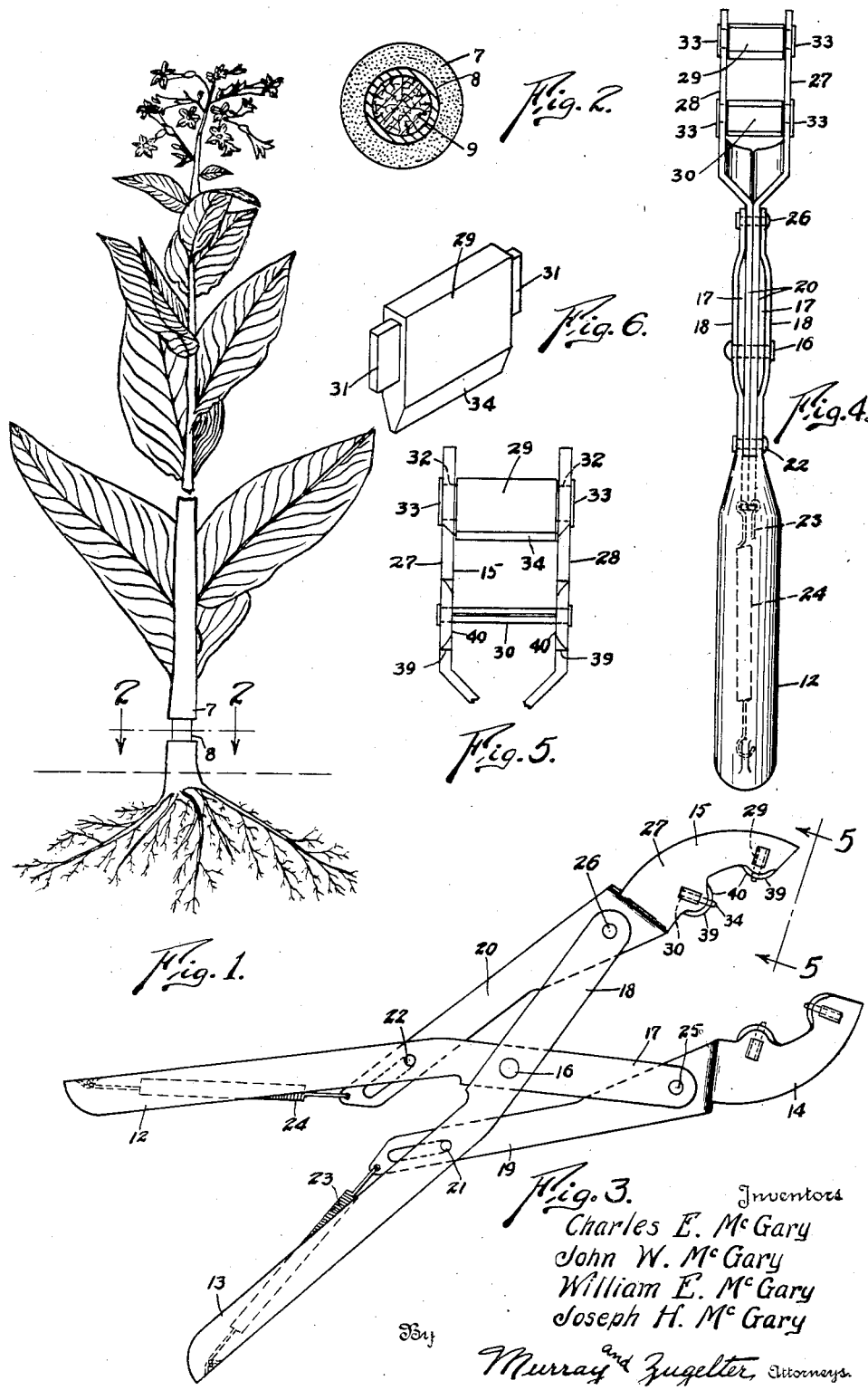

1,987,368

UNITED STATES PATENT OFFICE 1,987,368

TOOL FOR TREATING TOBACCO PLANTS

Charles E. McGary, Hardinsburg, and John W. McGary, William E. McGary, and Joseph H. McGary, Kirk, Ky.

Application July 20, 1933, Serial No. 681,332

8 Claims. (Cl. 47—57)

This invention relates to a means for the treatment of growing tobacco plants.

Objects of the invention are: to produce a highly colored grade of leaf without material loss of weight; to control the tobacco plant while in the field, for various purposes including initiating the "yellowing" period at any stage of growth of the plant; to facilitate harvesting, and shorten the curing period; to increase the commercial value of the tobacco crop; to increase the quality of such tobacco plants as are subnormal in size and apt to be late in maturing or ripening; to render the leaves substantially immune to sunburn, house-burn, and breakage; and to provide means for carrying out the process of the invention.

The foregoing and other objects are attained by the means described herein and disclosed in the accompanying drawing, in which:

Fig. 1 is an elevational view of a tobacco plant treated or processed in accordance with the invention.

Fig. 2 is a cross-sectional view of the plant stem, the view being taken on line 2—2 of Fig. 1.

Fig. 3 is a plan view of one form of tool that may be employed in processing the plant.

Fig. 4 is a side view of the tool disclosed in Fig. 3.

Fig. 5 is a fragmental elevational view taken on line 5—5 of Fig. 3.

Fig. 6 is a perspective view of a scraper element forming part of the tool shown in Figs. 3 and 4.

In the commercial growing of tobacco for the manufacture of cigars, cigarettes, and smoking tobaccos, it is very desirable to produce an uniformly highly colored, thin leaf type of tobacco. The aforesaid character of tobacco heretofore has been difficult to produce, despite most careful cultivating, harvesting, and curing, for the reason that the growth, ripening, curing and preparation of the tobacco were dependent almost entirely upon favorable weather conditions. By means of the present invention, however, the producer is enabled to control his tobacco plants so as to secure the above stated character of tobacco leaf with a minimum of effort and waste, and approximately at a time predetermined by the producer.

The invention consists, broadly, in interrupting or terminating the flow of plant food in the tobacco plant at a predetermined stage of the plant's growth. This may be effected by a process we shall refer to as "girdling" or "belting", these terms meaning to remove so much of the fluid-conveying portion of the plant stem as will preclude substantially the flow of fluid between the leaves and the roots thereof. As illustrated in Fig. 1, the green bark or cell structure which conveys the major portion of the plant food to the roots has been removed, by cutting, fracturing, or scraping away a band of the green bark, down to the wood portion of the stem. The green bark or the plant food conveying tissues of the stem is indicated by the character 7, and the tubular wood portion is indicated at 8. At 9 is indicated the pithy center of the stem. The illustration of Fig. 2 clearly shows that a ring or band of the plant food conveying portion has been removed from the stem to the extent of exposing the wood 8.

In practice, the base of the tobacco plant stem is belted, as above described, any time after the leaves become large enough to be of commercial value. For a period of from one to four weeks after the belting operation the plants are permitted to stand in the field, and within said period the leaves take on a high yellow color such as is characteristic of perfect and most carefully grown tobacco. After curing, the tobacco is stripped and graded in accordance with common practice.

The advantages of the process above described are numerous. For example, the producer may apply the process to tobacco plants before maturity for the purpose of initiating the yellowing period prematurely and securing an early harvest. In so doing, there results the desirable highly colored grade of thin leaf which heretofore has been difficult of production. Furthermore, application of the process seems to impart to the leaves a certain toughness and pliability that renders them highly resistant to breakage, injuries, and sunburn; and due to the fact that the plants are highly yellowed before housing, whereby to shorten the curing period, the affliction known as "house-burn" is reduced to minimum.

It is pointed out that plants which would under normal conditions develop into an overgrown, coarse, large fiber grade of leaf having a low commercial value, can be treated, before maturity, in the manner above set forth so that the yellowing process will commence before the plants reach their natural size. By applying the treatment to plants which are subnormal in size and late for harvesting, they can be caused to yellow desirably at a time earlier than the expected harvesting date. However, the process probably would be most frequently applied to plants of normal size and in a normal stage of development for the purposes set forth in the preceding paragraph, and in such case the plants would be belted one to four weeks before harvesting time.

For the burley tobaccos grown in the northern and central portions of Kentucky, excellent results are obtained by processing the plant after it has been "topped" and has reached about one-half its normal maturity from this stage, that is, when the plant has had six to ten suckers plucked out. However, a very fine grade of thin leaf of the smoking or cigarette grade may be produced by processing the plant as soon as the top has been broken out.

One form of tool which may be employed for belting the tobacco plants is illustrated in Figs. 3 to 6 inclusive. As shown, the tool comprises a pair of handle members 12 and 13 and suitable leverage mechanism associated therewith to contract the head pieces 14 and 15 about the plant stem when the handles are pressed toward one another. The leverage mechanisms which may be employed are various, but for purposes of explanation we have shown one in which each handle member has a pair of spaced parallel extensions or lever ends one pair of which is pivoted upon the other pair as at 16. The spaced parallel lever ends of handle 12 are indicated by the character 17, whereas those of handle 13 are indicated at 18.

The head pieces each have an integral lever end, indicated by the characters 19 and 20, and these each have a sliding connection at 21 and 22 upon the handles 13 and 12, respectively. Springs 23 and 24 tend to urge the levers 19 and 20 in the general direction of the handle ends whereby to maintain the head pieces in spaced relationship.

The extreme forward ends of the lever members 17 and 18 are pivoted, respectively, upon the members 19 and 20, as at 25 and 26, at a location intermediate the head pieces and the sliding connections 21 and 22.

Particular attention is directed to the construction of the head pieces. Inasmuch as the head pieces are identical, a description of one will suffice for the other also. The head piece 15 comprises a pair of sheet members 27 and 28 which are spaced apart in substantial parallelism by means of two or more scraper blades or elements 29 and 30. Each scraper element has a pair of reduced end portions 31 that extend through suitable openings 32 in the sheet members and are peened over as at 33 to maintain the parts rigidly connected. The inner or working edge 34 of each scraper element preferably is tapered to provide a wedge-like construction capable of sinking readily into the green bark of the plant stem when the handles are actuated to close the jaws or head pieces 14—15. The scraper elements preferably are arranged to radially approach the plant stem, that is, they are disposed at an angle relative to one another (Fig. 3).

The plate members 27 and 28 are provided with ears or lobes 39 corresponding in number to the number of scraper elements, and these are ground or shaped to provide cutting edges 40 located adjacent to the tapered edges of the scraper elements. The tapered edges of the scraper elements extend inwardly beyond the cutting edges, as shown, so that the extent to which the cutting edges may penetrate the green bark of the plant stem is limited by the comparatively dull tapered edges of the scraper elements. Thus, the sharp cutting edges are precluded from penetrating the woody section of the plant stem. When four scraper elements are employed, as shown in Fig. 3, a complete band of bark may be removed from the plant stem upon rotating the tool through about a ninety degree arc. If a greater number of scraper elements and cutting edges are provided on the tool, the rotational movement necessary to remove the bark will be decreased.

The invention insures the production of a highly desirable tobacco product, with a minimum of effort and waste. The method minimizes the producer's work because it imparts to the leaves a certain toughness and pliability that nearly immunizes against injury and breakage of the leaf during handling. The fact that part of the curing is effected in the field also decreases the amount of labor connected with curing the tobacco in the shed. Various other advantages resulting from the new process have been set forth hereinbefore.

What is claimed is:

1. As a new article of manufacture, a device for removing a band of tissue from a plant stem said device comprising a plurality of head members and handle means for moving the head members relatively toward and from each other, a series of scraping elements mounted upon the head members in angular relationship to sink into the tissue radially of the plant stem and remove the band of tissue upon rotation of the head members about the stem and sharpened cutting means associated with each scraping element for cutting into the tissue circumferentially of the stem to limit the width of the band of tissue removed, the scraping elements being extended forwardly of the cutting means to preclude the cutting means from entering the wood portion of the plant stem.

2. As a new article of manufacture, a device for removing a band of tissue from a plant stem said device comprising a plurality of head members and handle means for moving the head members relatively toward and from each other, at least one of which head members comprises a pair of spaced plates, a series of scraping blades mounted between said plates each with an edge extended toward the other head member at an angle to radially penetrate the tissue of the plant stem, and sharpened cutting means located at each end of each scraping blade for cutting into the tissue circumferentially of the stem to limit the width of the band of tissue removed, the scraping blades being extended slightly forwardly of the cutting means to preclude the cutting means from entering the wood portion of the plant stem.

3. As a new article of manufacture, a device for removing a band of food-conveying tissue from a plant stem said device comprising a plurality of head members and handle means for moving the head members relatively toward and from each other, a series of scraping elements mounted upon the head members in angular relationship to sink into the tissue radially of the plant stem and remove the band of tissue upon rotation of the head members about the stem and sharpened cutting means associated with the scraping elements for cutting into the tissue circumferentially of the stem to limit the width of the band of tissue removed, the scraping elements being extended forwardly of the cutting means to preclude the cutting means from entering the wood portion of the plant stem.

4. As a new article of manufacture, a device for removing a band of food-conveying tissue from a plant stem said device comprising a plurality of head members and handle means for moving the head members relatively toward and from each other, a series of scraping elements mounted upon the head members in angular relationship to sink into the tissue radially of the plant stem and remove the band of tissue upon rotation of the head members about the stem and means carried by the head members for determining the width of the band of tissue removed, the scraping elements being extended forwardly of said last mentioned means to preclude said means from entering the wood portion of the plant stem.

5. As a new article of manufacture, a device for removing a band of tissue from a plant stem said device comprising a plurality of head members and handle means for moving the head members relatively toward and from each other, a series of scraping elements upon the head members in angular relationship to sink into the tissue radially of the plant stem and remove the band of tissue upon rotation of the head members about the stem, said scraping elements each having a blunt scraping edge, and sharpened cutting means associated with each scraping element for cutting into the tissue circumferentially of the stem to limit the width of the band of tissue removed, the blunt edges of the scraping elements being extended forwardly of the cutting means to preclude the cutting means from entering the wood portion of the plant stem.

6. As a new article of manufacture, a device for removing a band of tissue from a plant stem said device comprising a plurality of head members and handle means for moving the head members relatively toward and from each other, at least one of which head members comprises a pair of spaced plates, a series of scraping blades mounted between said plates each with an edge extended toward the other head member at an angle to radially penetrate the tissue of the plant stem, and means located at each end of each scraping blade for entering the tissue circumferentially of the stem to limit the width of the band of tissue removed, the scraping blades being extended slightly forwardly of said tissue entering means to preclude said means from entering the wood portion of the plant stem.

7. As a new article of manufacture, a device for removing a band of tissue from a plant stem, said device comprising a plurality of head members, a lever associated with each head member, a series of scraping elements mounted upon the head members in angular relationship to sink into the tissue radially of the plant stem and remove the band of tissue upon rotation of the head members about the stem, means carried by the head members for determining the width of the band of tissue removed, the scraping elements being extended forwardly of said last mentioned means to preclude said means from entering the wood portion of the plant stem, handle means for actuating the head members, and means cooperating with the handle means and the lever element thereof, for advancing the head members toward and from each other in substantial parallelism.

8. As a new article of manufacture, a device for removing a band of tissue from a plant stem, said device comprising a plurality of head members, a lever element extending from each head member, a series of scraping elements mounted upon the head members in angular relationship to sink into the tissue radially of the plant stem and remove the band of tissue upon rotation of the head members about the stem, cutting means associated with the scraping elements for cutting into the tissue circumferentially of the stem to limit the width of the band of tissue removed, the scraping elements being extended forwardly of the cutting means to preclude the cutting means from entering the wood portion of the plant stem, a pair of handle members, means cooperating with the handle members and the lever elements of the head members for moving the head members toward one another so as to maintain the head members and the lever elements thereof in a substantially parallel relationship, and spring means for yieldingly urging the head members apart.

CHARLES E. McGARY.
JOHN W. McGARY.
WILLIAM E. McGARY.
JOSEPH H. McGARY.